(12) United States Patent
Sakata et al.

(10) Patent No.: US 6,761,458 B2
(45) Date of Patent: Jul. 13, 2004

(54) REAR PROJECTION OPTICAL SYSTEM

(75) Inventors: Shigeyoshi Sakata, Takatsuki (JP); Tomokazu Masubuchi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/192,239

(22) Filed: Jul. 10, 2002

(65) Prior Publication Data

US 2003/0011753 A1 Jan. 16, 2003

(30) Foreign Application Priority Data

Jul. 13, 2001 (JP) ........................................ 2001-213059

(51) Int. Cl.⁷ .......................... G03B 21/28; G03B 21/22
(52) U.S. Cl. .......................................... 353/78; 353/74
(58) Field of Search ............................ 353/46, 47, 48, 353/49, 50, 51, 74, 77, 79, 80, 119; 359/446, 456, 457, 460; 348/782, 783, 784, 787, 788, 789

(56) References Cited

U.S. PATENT DOCUMENTS

| | | | | | |
|---|---|---|---|---|---|
| 3,945,722 | A | * | 3/1976 | Prueitt | 353/122 |
| 4,941,732 | A | * | 7/1990 | Umeda et al. | 359/456 |
| 5,278,595 | A | | 1/1994 | Nishida et al. | 353/78 |
| 5,491,585 | A | * | 2/1996 | Dolgoff | 359/449 |
| 5,741,057 | A | * | 4/1998 | Goldberg et al. | 353/74 |
| 6,163,348 | A | * | 12/2000 | Izumi et al. | 348/761 |
| 6,388,810 | B1 | * | 5/2002 | Monson et al. | 359/443 |
| 6,508,556 | B1 | * | 1/2003 | Ueda | 353/74 |
| 6,575,578 | B2 | * | 6/2003 | Ito | 353/37 |

* cited by examiner

*Primary Examiner*—Russell Adams
*Assistant Examiner*—Andrew Sever
(74) *Attorney, Agent, or Firm*—Sidley Austin Brown & Wood LLP

(57) ABSTRACT

Disclosed herewith is a rear projection optical system for being installed at a rear side of a screen of a rear projection apparatus. The rear projection system comprises: a display panel; a illuminating optical system for illuminating the display panel, the illuminating optical system being decentered from a screen center in both of a horizontal direction and a vertical direction; and a projection optical system, decentered from the screen center in the vertical direction, for projecting a display image on the display panel projected by the illuminating optical system onto a screen through a rear mirror positioned at a position that is the center of the screen. The projection optical system comprises a dioptric system, a deflection mirror, and a curved mirror in this order from the display panel to the rear mirror, and the curved mirror is decentered from the screen center in the vertical direction but centered against the screen center in the horizontal direction.

16 Claims, 4 Drawing Sheets

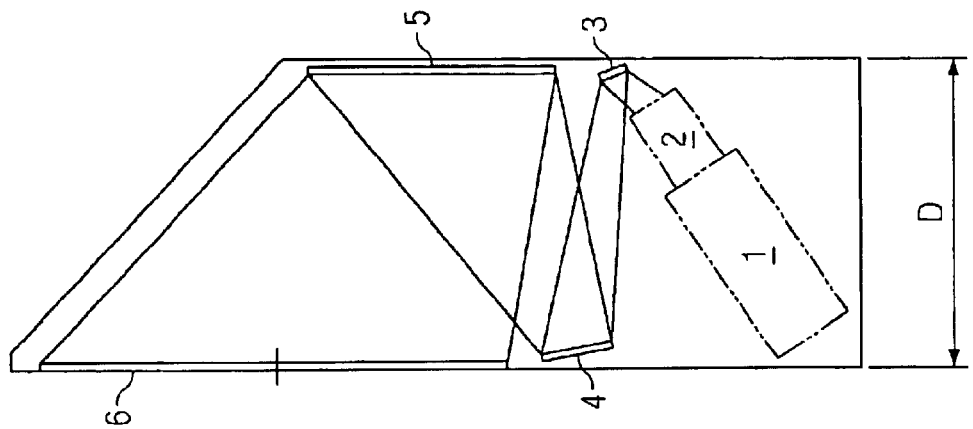
FIG. 7(B) *(PRIOR ART)*
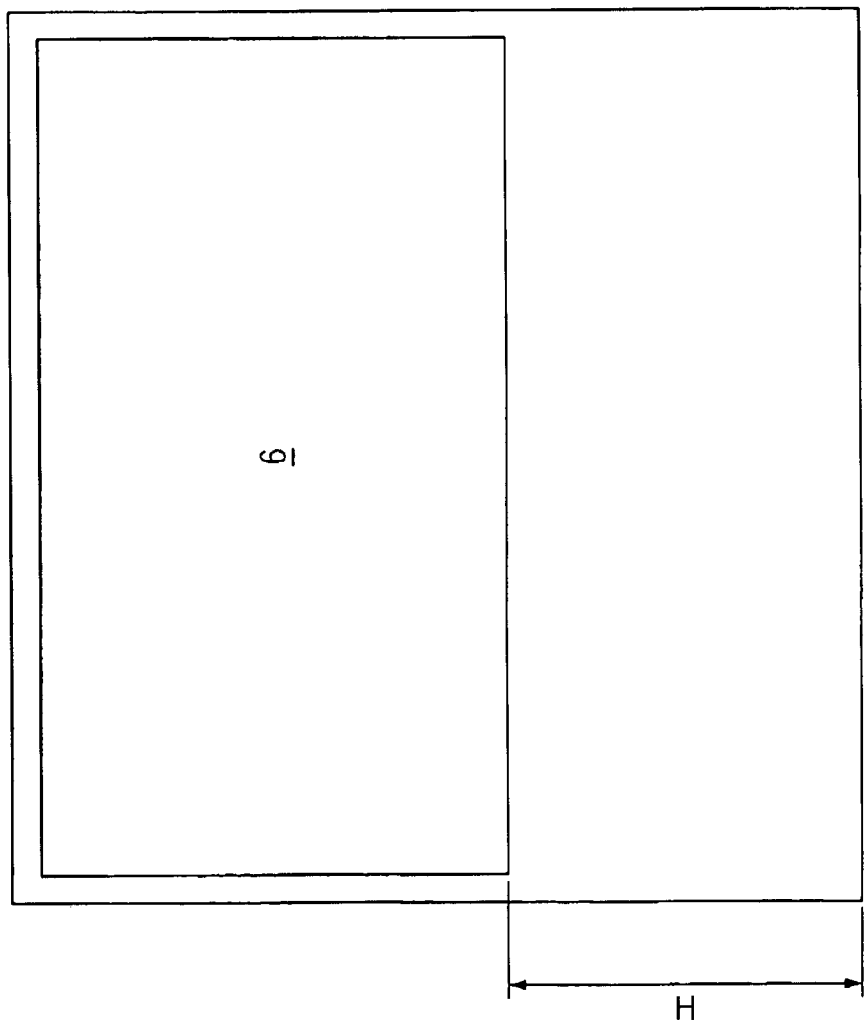
FIG. 7(A) *(PRIOR ART)*

REAR PROJECTION OPTICAL SYSTEM

CROSS-REFERENCE TO RELATED APPLICATION

This application is based on Japanese Patent Application No. 2001-213059 filed in Japan on Jul. 13, 2001, the entire content of which is hereby incorporated by reference.

BACKGROUND OF THE INVENTION

1. Field of the Invention

The present invention relates to a rear projection optical system. More concretely, the invention relates to the rear projection optical system which is suitable to a rear projection apparatus (for example, a rear projection television) for enlarging and projecting a display image of a display panel (for example, a liquid crystal panel) on a screen from a rear side.

2. Description of the Related Art

FIGS. 7(A) and 7(B) are a front view and a right side view of a rear projection television into which a rear projection optical system of a conventional example is incorporated. This rear projection television has an illuminating optical system (1), a projection lens (2), a deflection mirror (3), a curved mirror (4), a rear mirror (5) and a screen (6). In this rear projection optical system, a display panel (not shown) is illuminated by the illuminating optical system (1) provided below the center of the screen (6), and a display image of the illuminated display panel is enlarged and projected onto the screen (6) by the projection lens (2) and the like. At this time, a projection light flux emitted from the projection lens (2) is reflected successively by the deflection mirror (3), the curved mirror (4) and the rear mirror (5) so as to reach the screen (6).

In the structure of the rear projection optical system shown in FIG. 7, a size (H) of a portion below the screen (6) (so-called portion chin or lower jaw) and a size of depth (D) becomes large, and thus the entire equipment becomes large.

SUMMARY OF THE INVENTION

The present invention is devised in order to solve the above problem, and its object is to provide a rear projection optical system which can achieve miniaturization and thinning of a rear projection apparatus.

To achieve the above mentioned object, a rear projection optical system corresponding to one aspect of the present invention installed at a rear side of a screen of a rear projection apparatus comprises: a display panel; an illuminating optical system for illuminating the display panel, the illuminating optical system being decentered from a screen center in both of a horizontal direction and a vertical direction; and a projection optical system, decentered from the screen center in the vertical direction, for projecting a display image on the display panel projected by the illuminating optical system onto a screen through a rear mirror positioned at a position that is the center of the screen. The projection optical system includes a dioptric system, a deflection mirror, and a curved mirror in this order from the display panel to the rear mirror, and the curved mirror is decentered from the screen center in the vertical direction but centered against the screen center in the horizontal direction.

In the above mentioned structure, when the rear projection apparatus is observed from one side thereof in the vertical direction, the illuminating optical system is provided at a position so as not to overlap with a light flux from the projection curved mirror to the rear mirror.

Further to or separately from the above, in the rear projection apparatus corresponding to one aspect of the invention, when the rear projection apparatus is observed from one side thereof in the vertical direction, the illuminating optical system may be provided at a position so as to at least partly overlap with a light flux from the rear mirror to the screen.

Further to or separately from the above, in the rear projection apparatus corresponding to one aspect of the invention, when observed from the one end of the screen in the horizontal direction, the illuminating optical system may be provided at a position so as to at least partly overlap with a light flux from the projection curved mirror to the rear mirror.

Further to or separately from the above, in the rear projection apparatus corresponding to one aspect of the invention, the illuminating optical system may comprise a plurality of optical element including a light source. In this case, the light source may mostly be centered in the horizontal direction among the plurality of optical elements.

Further to or separately from the above, in the rear projection apparatus corresponding to one aspect of the invention, the dioptric system may be provided so that an optical axis thereof is parallel to the screen.

Further to or separately from the above, in the rear projection apparatus corresponding to one aspect of the invention, the curved mirror may have a negative optical power to enlarge a light flux of the display image.

BRIEF DESCRIPTION OF THE DRAWINGS

These and other objects and features of the present invention will become apparent from the following description of preferred embodiments thereof taken in conjunction with the accompanying drawings, in which:

FIGS. 7(A) and 7(B) are optical structural diagrams showing a rear projection television mounted with a conventional rear projection optical system.

DETAILED DESCRIPTION OF THE PREFERRED EMBODIMENTS

There will be explained below a rear projection optical system of the present invention with reference to the drawings. The vertical arrangement of the rear projection optical system and a rear projection apparatus of the present invention is not limited to ones shown in the optical structural diagrams, and their arrangement may be turned upside down. Namely, there arises no problem if the upper side in the respective optical structural diagrams the lower side for convenience of the actual arrangement.

Figure 1B:
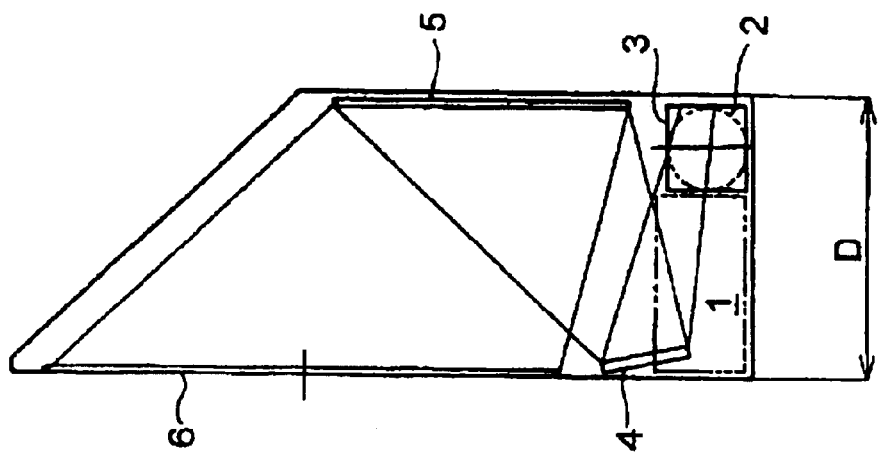
FIGS. 1(A) and 1(B) are an optical front view showing a rear projection television mounted with a rear projection optical system and a side view showing an optical structure and a projection optical path, respectively.
Figure 1A:
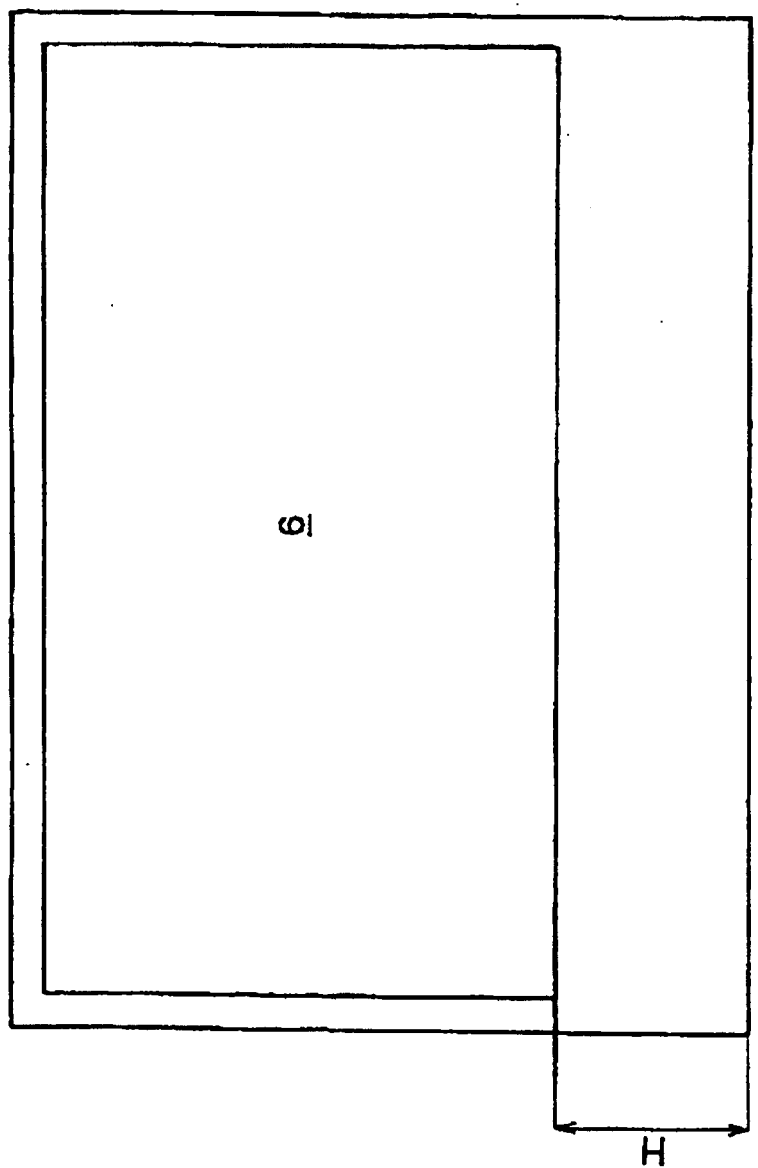

FIGS. 1(A) and 1(B) show an optical structure and a projection optical path of the rear projection television into which a rear projection optical system reflecting aspects of the present invention is incorporated. In these figures, FIG. 1(A) is a front view, and FIG. 1(B) is a right side view. Moreover, similarly to the conventional example (FIG. 7), (1) is an illuminating optical system, (2) is a projection lens, (3) is a deflection mirror, (4) is a curved mirror, (5) is a rear mirror, and 6 is a screen. The rear projection optical system mounted into the rear projection television has the illuminating optical system (1) for illuminating a display panel (not shown in these figures), and a projection optical system for enlarging and projecting a display image of the illuminated display panel onto the screen from a slanted direction. As the display panel, for example, two-dimensional display element such as a reflection liquid crystal panel, a transmission liquid crystal panel, or DMD (Digital Micromirror Device) is used. Moreover, the projection optical system is composed of the projection lens (2), the deflection mirror (3) and the curved mirror (4) in the order from the display panel side (namely, reduction side) along the optical path. The projection lens (2) is a refractive optical system with a positive power composed of a lens, diaphragm and the like. A reflection surface of the deflection mirror (3) is composed of a plane, and a reflection surface of the curved mirror (4) is composed of a sculptured surface with a negative power.

Figure 2:
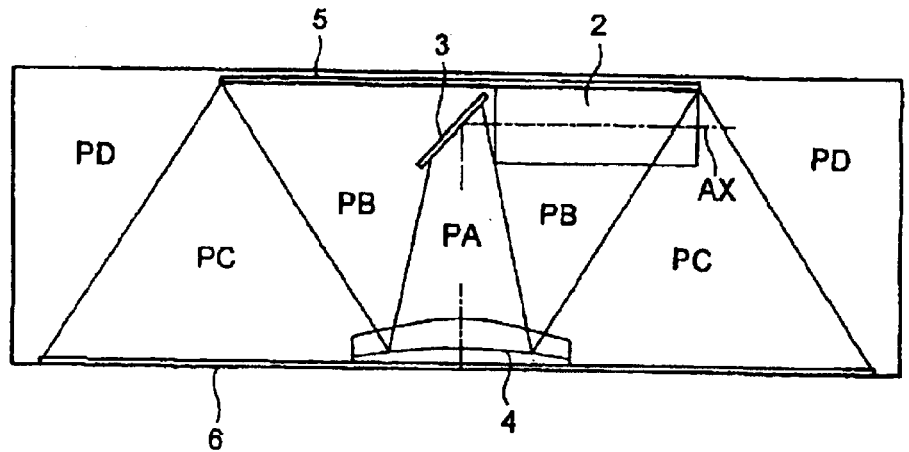
FIG. 2 is a plan view showing the optical structure and the projection optical path of the rear projection television shown in FIG. 1.

FIG. 2 shows the optical structure and projection optical path from the projection optical system to the screen (6) when the entire rear projection apparatus is observed from the top side of the screen (6). After a projection light flux emitted from the display panel passes through the projection lens (2), the optical path is bent approximately 90° by the deflection mirror (3). The projection light flux is then reflected by the curved mirror (4) towards the rear mirror (5). The light flux is emitted from a portion approximately below the screen (6) (a portion above the screen when the apparatus arrangement is turned upside down) towards the rear mirror (5) and is reflected by the rear mirror (5) so as to reach the screen (6). The rear mirror (5) is arranged to be opposed to the screen (6), and its reflection surface is composed of a plane which is approximately parallel with the screen (6).

When the entire system of the rear projection optical system is viewed from the right side of the screen (6) (namely, from the side surface of the apparatus), as shown in FIG. 11(B), the illuminating optical system (1) is positioned so as to partially overlap with the projection light flux from the projection optical system to the rear mirror (5) (this is applicable to the case viewed from the left side). The illuminating optical system (1) is on the approximately same level as the projection light flux but is positioned separately from the projection light flux in a right-left direction towards the screen (6). The illuminating optical system (1) is arranged on the approximately same level as the projection optical system such as the projection lens (2) without interference with the projection optical path and the projection optical system, so that the size (H) of the portion below the screen (so-called lower jaw portion) is shortened. As a result, the miniaturization of the rear projection television is achieved.

In order to arrange the illuminating optical system (1) on approximately the same level as the projection optical system without interference with the projection optical path, it is desirable that an optical axis (AX, FIG. 2) of the projection lens (2) is parallel and horizontal with the screen (6) and the curved mirror (4) is positioned below the center of the screen (6) (above the center when the apparatus arrangement is turned upside down). When the optical axis (AX) of the projection lens (2) is decentered from the parallel arrangement, the size (D) of the depth becomes long, and when the optical axis (AX) of the projection lens (2) is decentered from the horizontal arrangement, the size (H) of the lower jaw portion becomes long. However, since the size (H) of the lower jaw portion is allowed to be slightly long due to applied fields, in this case, the optical axis (AX) is not necessarily on the horizontal arrangement. Meanwhile, when the curved mirror (4) is positioned to be decentered from the center portion below the screen (6), the size of the depth (D) becomes long, and the optical performance is deteriorated.

As shown in FIG. 2, in the case where the entire rear projection apparatus is viewed from the top side of the screen (6), a space in the rear projection apparatus is divided into four areas (PA, PB, PC and PD) at the right and left outermost optical paths. With this optical structure, when the illuminating optical system (1) provided in the area (PA) at the center of the screen (6) and the area (PB) adjacent to the area (PA), the illuminating optical system (1) blocks the projection optical path of the display image. The area (PC) on the outer side of the area (PB) has enough height, and the area (PD) on the outer side does not have a height limitation due to the projection optical path. Therefore, when the illuminating optical system (1) is arranged in the areas (PC, PD) positioned on the right and left outer sides of the rear projection apparatus, the space in the apparatus can be used effectively without interference with the projection optical path. For this reason, miniaturization and thinning of the rear projection apparatus can be achieved.

From the above view points, it is desirable that the illuminating optical system (1) is positioned below the screen (6) (or above the screen (6) when the apparatus arrangement is turned upside down) and is decentered from the center of the screen (6) to the right or left direction. Moreover, when the entire system is viewed from the top or bottom side of the screen (6), it is desirable that the illuminating optical system (1) is positioned not to overlap with the light flux from the projection optical system to the rear mirror (5) (light flux corresponding to the areas PA and PB). With this structure, since the illuminating optical system (1) is arranged in a position decentered from the center of the screen (6) so as not to interfere with the projection optical path up to the screen (6), the miniaturization and thinning of the rear projection apparatus can be achieved.

There will be explained below detailed arrangement and the like of the illuminating optical system (1) exemplifying four embodiments (FIGS. 3 through 6) of the rear projection optical system. In the illuminating optical system (1) shown in FIGS. 3 and 4, a light emitted from a lamp (10) passes through a first converging lens (11), a color wheel (12) and a second converging lens (13), and its optical path is bent by a first deflection mirror (14). The light reflected by the first deflection mirror (14) passes through a first lens array (15), is reflected by a rectangular PBS (Polarizing Beam Splitter) prism (16), passes through a second lens array (17) and a superposing lens (18), so that its optical path is bent by a second deflection mirror (19). The light reflected by the second deflection mirror (19) passes through a condenser lens (20) and is reflected by a PBS prism (21) so as to reach a reflection-type display panel (22). The light which enters the display panel (22) is reflected by the image display surface and again passes through the PBS prism (21) so as to reach the projection lens (2).

Figure 4:
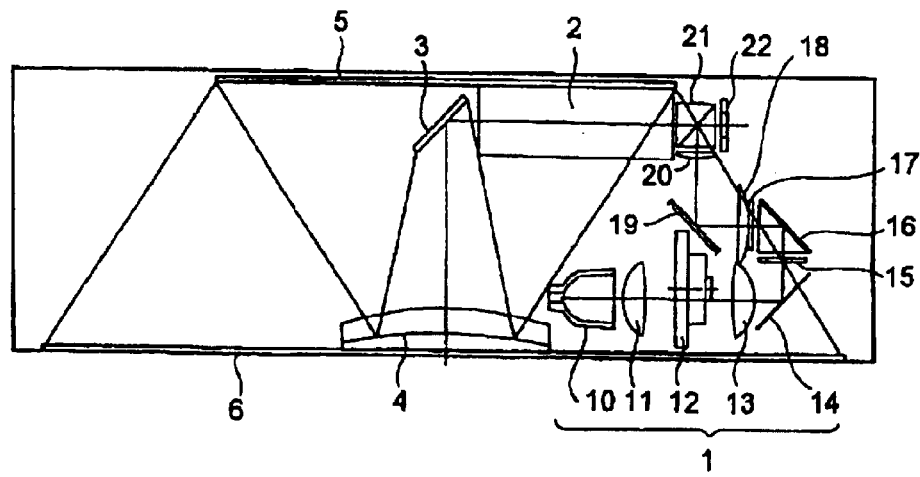
FIG. 4 is a plan view showing a second embodiment of the rear projection optical system.
Figure 5:
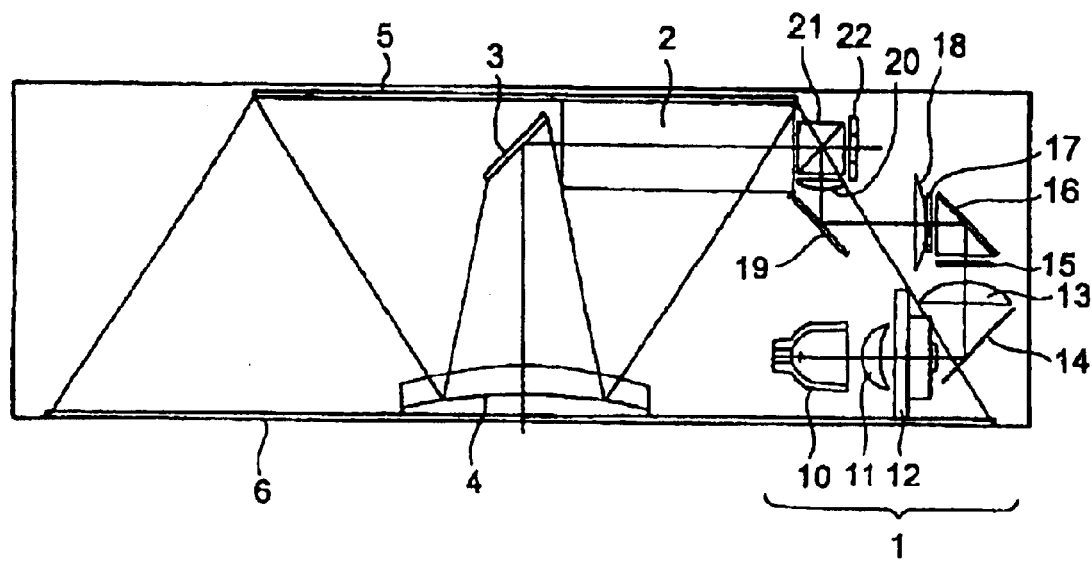
FIG. 5 is a plan view showing a third embodiment of the rear projection optical system.
Figure 6:
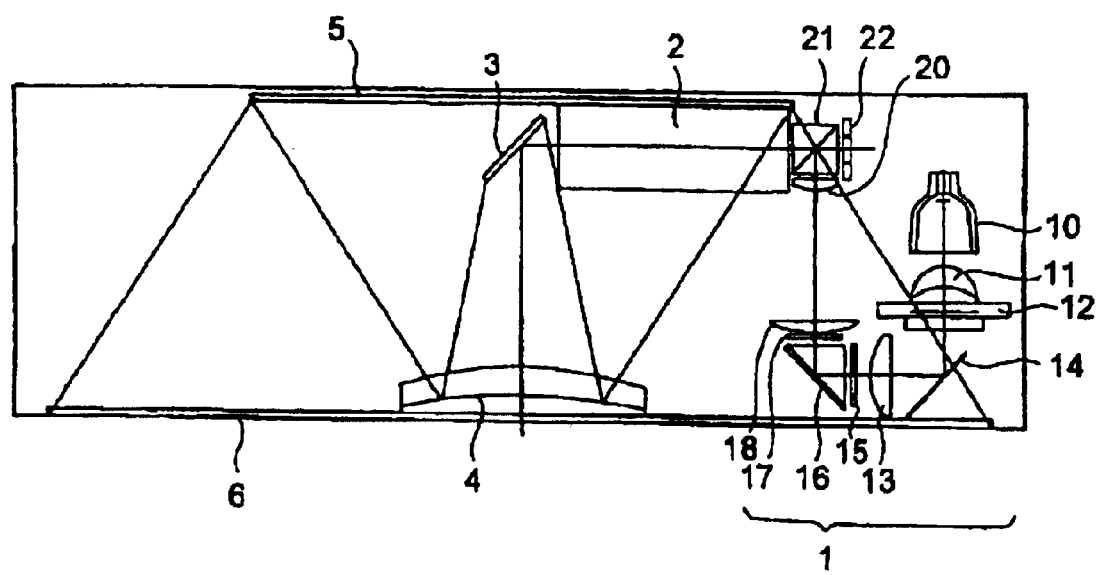
FIG. 6 is a plan view showing a fourth embodiment of the rear projection optical system.

In the illuminating optical system (1) shown in FIGS. 5 and 6, the order of the second converging lens (13) and the first folding mirror (14) is reversed, and in the illuminating optical system (1) shown in FIG. 6, additionally, the second deflection mirror (19) is omitted and a number of deflection times of the illuminating optical path is reduced to two. The deflection type of the illuminating optical path varies, but the illuminating optical system (1) has the same basic optical structure in all the embodiments (FIGS. 3 through 6). The illuminating optical system (1) is arranged in the outer areas (PC, PD; FIG. 2) in the rear projection apparatus. For this reason, as mentioned above, the sizes (H, D; FIG. 1) of the lower jaw portion and depth are shortened, so that the miniaturization and thinning of the rear projection apparatus can be achieved.

Figure 3:
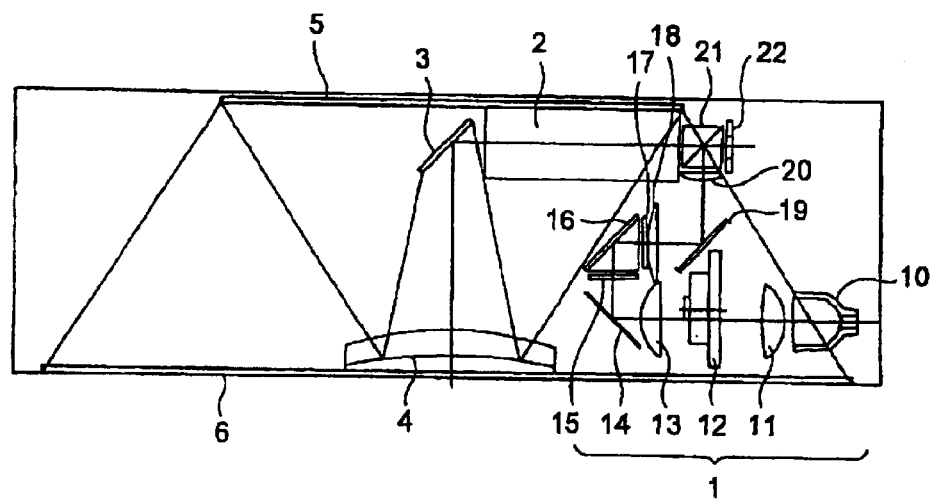
FIG. 3 is a plan view showing a first embodiment of the rear projection optical system.

It is desirable that the lamp (10) included as a light source in the illuminating optical system (1) is positioned to be decentered from the center of the screen (6) to the rightmost side in the illuminating optical system (1) as shown in FIG. 3, for example, and is positioned to be separated from the projection optical system to the rightmost side in the illuminating optical system (1). In the case where the illuminating optical system (1) is on the left side, it is desirable that the lamp (10) is positioned to be decentered from the center of the screen (6) to the leftmost side in the illuminating optical system (1), and is positioned to be separated from the projection optical system to the leftmost side in the illuminating optical system (1). When the lamp (10) is arranged to be decentered from center of the screen (6) to the left or right direction, since the lamp (10) is close to the side surface of a housing of the rear projection apparatus, the apparatus structure is such that the lamp is easily replaced. Moreover, when the lamp (10) is arranged to be separated from the projection optical system to the right or left direction, the influence of heat from the lamp (10) exerted on the projection optical system can be small.

As explained above, according to the rear projection optical system reflecting aspects of the present invention, since the illuminating optical system is positioned below or above the screen and positioned to be decentered from the screen center to the left or right, the miniaturization and thinning of the rear projection apparatus can be achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rear projection optical system for being installed at a rear side of a screen of a rear projection apparatus, the rear projection optical system comprising:
    a display panel;
    an illuminating optical system for illuminating the display panel, the illuminating optical system being decentered from a screen center in both a horizontal direction and a vertical direction; and
    a projection optical system, decentered from the screen center in the vertical direction, for projecting a display image on the display panel projected by the illuminating optical system onto the screen through a rear mirror positioned at a position that is the center of the screen,
    wherein the projection optical system includes a dioptric system, a deflection mirror, and a projection curved mirror in this order from the display panel to the rear mirror, and wherein the projection curved mirror is decentered from the screen center in the vertical direction but centered against the screen center in the horizontal direction, and
    wherein, when the rear projection apparatus is observed from one side thereof in the vertical direction, the illuminating optical system at least partly overlaps with a light flux from the rear mirror to the screen.

2. A rear projection optical system as claimed in claim 1, wherein, when the rear projection apparatus is observed from one side thereof in the vertical direction, the illuminating optical system does not overlap with a light flux from the projection curved mirror to the rear mirror.

3. A rear projection optical system as claimed in claim 2, wherein, when the rear projection apparatus is observed from one end of the screen in the horizontal direction, the illuminating optical system at least partly overlaps with the light flux from the projection curved mirror to the rear mirror.

4. A rear projection optical system as claimed in claim 3, wherein, when the rear projection apparatus is observed from one end of the screen in the horizontal direction, the illuminating optical system at least partly overlaps with the light flux from the projection curved mirror to the rear mirror.

5. A rear projection optical system as claimed in claim 1, wherein the illuminating optical system includes a plurality of optical elements including a light source, and wherein the light source is most decentered in the horizontal direction among the plurality of optical elements.

6. A rear projection optical system as claimed in claim 1, wherein the dioptric system is provided so that an optical axis thereof is parallel to the screen.

7. A rear projection optical system as claimed in claim 6, wherein the optical axis of the dioptric system is horizontal.

8. A rear projection optical system as claimed in claim 1, wherein an optical axis of the dioptric system is horizontal.

9. A rear projection optical system as claimed in claim 1, wherein the projection curved mirror has a negative optical power to enlarge a light flux of the display image.

10. A rear projection apparatus comprising:
    a screen for displaying an image;
    a display panel;
    an illuminating optical system for illuminating the display panel, the illuminating optical system being decentered from a screen center in both a horizontal direction and a vertical direction; and
    a projection optical system, decentered from the screen center in the vertical direction, for projecting a display image on the display panel projected by the illuminating optical system onto the screen through a rear mirror positioned at a position that is the center of the screen,
    wherein the projection optical system includes a dioptric system, a deflection mirror, and a projection curved mirror in this order from the display panel to the rear mirror, and wherein the projection curved mirror is decentered from the screen center in the vertical direction but centered against the screen center in the horizontal direction, and
    wherein, when the rear projection apparatus is observed from one side thereof in the vertical direction, the illuminating optical system at least partly overlaps with a light flux from the rear mirror to the screen.

11. A rear projection apparatus as claimed in claim 10, wherein, when the rear projection apparatus is observed from one side thereof in the vertical direction, the illuminating optical system does not overlap with a light flux from the projection curved mirror to the rear mirror.

12. A rear projection apparatus as claimed in claim 10, wherein, when the rear projection apparatus is observed from one end of the screen in the horizontal direction, the illuminating optical system at least partly overlaps with a light flux from the projection curved mirror to the rear minor.

13. A rear projection apparatus as claimed in claim 10, wherein the illuminating optical system includes a plurality of optical elements including a light source, and wherein the light source is most decentered in the horizontal direction among the plurality of optical elements.

14. A rear projection apparatus as claimed in claim 10, wherein the dioptric system is provided so that an optical axis thereof is parallel to the screen.

15. A rear projection apparatus as claimed in claim 10, wherein an optical axis of the dioptric system is horizontal.

16. A rear projection apparatus as claimed in claim 10, wherein the projection curved minor has a negative optical power to enlarge a light flux of the display image.

* * * * *